United States Patent

Brousseau

[11] Patent Number: 6,018,882
[45] Date of Patent: Feb. 1, 2000

[54] OIL DIPSTICK WIPER

[76] Inventor: Jean-Pierre Brousseau, 2201 Trim Road, Orleans, Ontario, Canada, K1A 3R2

[21] Appl. No.: 08/967,757

[22] Filed: Nov. 10, 1997

[51] Int. Cl.⁷ .................................................. G01B 3/00
[52] U.S. Cl. ................................. 33/725; 33/722; 33/730
[58] Field of Search ........................... 33/725, 731, 722; 15/220.4, 210; 285/279, 319; 403/328, 329

[56] References Cited

U.S. PATENT DOCUMENTS

| | | | |
|---|---|---|---|
| 4,017,935 | 4/1977 | Hermandez | 15/210 |
| 4,103,388 | 8/1978 | DeVitis | 15/210 |
| 4,164,054 | 8/1979 | Hanson et al. | 15/210 |
| 4,422,204 | 12/1983 | Long, Jr. | 15/210 |
| 4,506,402 | 3/1985 | Long, Jr. | 15/210 |
| 4,658,462 | 4/1987 | Elassar | 15/210 |
| 4,716,615 | 1/1988 | Whitehead et al. | 15/210 |
| 4,860,401 | 8/1989 | Deveaux | 15/210 |
| 4,942,669 | 7/1990 | Schnedl | 33/725 |
| 5,046,214 | 9/1991 | Keidar | 15/210 |
| 5,231,728 | 8/1993 | Schillinger | 15/220.4 |
| 5,598,602 | 2/1997 | Gibson | 15/220.4 |

FOREIGN PATENT DOCUMENTS

| | | |
|---|---|---|
| 271047 | 2/1927 | Canada . |
| 294674 | 11/1929 | Canada . |
| 310006 | 4/1931 | Canada . |
| 532889 | 11/1956 | Canada . |
| 836207 | 3/1970 | Canada . |
| 1303304 | 6/1992 | Canada . |
| 2065822 | 4/1994 | Canada . |

Primary Examiner—Peter S. Wong
Assistant Examiner—Pia Tibbits
Attorney, Agent, or Firm—Martin Marcus

[57] ABSTRACT

An improved oil dipstick wiper assembly is provided herein. The oil dipstick wiper assembly includes a hollow housing having a central longitudinal bore having an upper end and a lower end for accommodating an oil dipstick. The hollowing housing includes an upper rectangular slotted plate which is disposed at the upper end of the central longitudinal bore for guiding the oil dipstick in longitudinal sliding movement, while substantially-simultaneously preventing rotation of the oil dipstick. Resilient wipers are provided which impinge into a major extent of the central longitudinal bore for wiping contact with an oil dipstick which is moved relatively longitudinally and non-rotationally thereto. Oil catchers are provided which are associated with the resilient wipers and which are disposed vertically therebelow. These oil catchers extend into the longitudinal bore out of contact with the oil dipstick, for catching oil which is wiped off of oil dipstick by the resilient wipers when the oil dipstick is in its longitudinal non-rotational sliding movement, and the hollow housing is selectively releasable from engagement with an oil dipstick guide tube which is secured to an engine. The selective releasability is provided by springs which are disposed within the longitudinal bore at the lower end thereof. In use the hollow housing and the oil dipstick are selectively-longitudinally-movable as a unit, and the oil dipstick is alternatively longitudinally, slidingly, and non-rotationally-selectively-movable by itself with respect to the hollow housing; and when the oil dipstick is longitudinally-moved by itself out of the hollow housing, oil is wiped off of the oil dipstick by wiping contact of the oil dipstick with the resilient wiper means, and, when the oil dipstick is returned to the hollow housing and is inserted into an oil sump of the engine and when a unit comprising the hollow housing and the oil dipstick is removed from engagement with the oil dipstick guide tube, oil remains on the oil dipstick so that the level of oil in the oil sump can be determined.

10 Claims, 3 Drawing Sheets

OIL DIPSTICK WIPER

BACKGROUND OF THE INVENTION (a) Field of the Invention

This invention relates to a dipstick wiper.

(b) Description of the Prior Art

It is a matter of common knowledge that, on the present day automobile engines and motors, an oil rod is provided on the crank case. This rod extends through an opening in the crank case and the rod is of a length to extend down to the bottom of the oil pan. On the upper end of the rod is an appropriate knob or handle.

Whenever it is desired to determine the approximate amount of lubricating oil in the crank case, the knob is grasped, and the rod is pulled out. In actual use, such rods are worthless after the engine has been operated, unless they are wiped before use, for the reason that oil splashed about in the base of the engine, thoroughly covers the rod and thus fails to leave any legible indication of the actual depth of oil in the sump. Consequently, before an accurate measurement may be made, it is necessary to wipe the rod substantially dry. This requires the use of a rag, or paper towel, and as a general rule, unless the measuring operation is deftly carried out, the operator will soil his hands and frequently his clothes. This makes the job undesirable and objectionable. Moreover, the disposal of such oil-soaked rags or paper towels is not environmentally-friendly.

Consequently, the art was faced with the problem of avoiding the messy operation of manually wiping the oil dipstick.

Canadian Patent No. 271,047, patented May 29, 1927, by E. W. Reen et al., provided a wiper for gauge rods, which consisted of a pair of felt pads and means for supporting and housing such pads.

Canadian Patent No. 294,674, patented Nov. 12, 1929, by J. W. Sharpe, provided an oil gauge wiper, which included a holder composed of a resilient plate curved inwardly at its outer sides. A doubled absorbent pad was mounted in the holder and was held in place by the curves of the plate. Means were connected to the plate to attach the plate to the block of an engine.

Canadian Patent No. 310,006, patented Apr. 7, 1931, by C. C. Adam, provided an oil rod wiper, which included a casing having aimed holes for passage of the rod. Means were provided for normally closing the holes to exclude dirt and dust. Wiping means in the casing included a pair of opposed, closely-spaced absorbent pads. The pads were curved in reversed directions with respect to each other to dispose the central crown portions thereof in closely-spaced proximity to facilitate insertion and removal of the rod.

Canadian Patent No. 532,889, patented Nov. 6, 1956, by E. Borza, provided an oil gauge rod wiper, which included the combination of a receptacle and a means for mounting the receptacle rigidly adjacent the engine oil gauge rod. An enclosure was fixed to the receptacle to discharge thereinto. Wiping material was contained in the enclosure. Slits in the enclosure and in the wiping material enabled the oil gauge rod to be inserted therein and passed therethrough.

Canadian Patent No. 836,207, patented Mar. 10, 1970, by W. J. Derva, provided an oil dipstick guide and wiper, which included a rigid tubular element for communication with the reservoir and reception of a dipstick. The tubular element had apertures in opposing wall portions thereof below the top thereof. A pliant wiper element in the form of a non-fibrous, essentially non-absorbent tube was telescoped over the apertured portion of the tubular element. The tube resiliently engaged the tubular element in sealed relation thereto below and above the apertures. The tube was squeezable through both the apertures between the thumb and finger of an operator into the interior of the tubular element for wiping contact with an oil dipstick in the tubular element. It normally flexed itself outwardly of the interior of the tubular element to accommodate unobstructed passage of the oil dipstick through the tubular element.

Canadian Patent No. 1,303,304, patented Jun. 16, 1992, by N. Tremblay, provided an engine oil dipstick indicator wiper, which included a small, rigid, relatively-thick frame which was adapted to be anchored by a support surface. A cavity was made to define a vertical channel, the cavity being bounded by two side walls and by an inner wall of the wiper member frame, wherein the oil dipstick can be moved through the channel in a direction generally parallel to the inner wall. At least one pair of semi-flexible flaps were mounted at their inner ends to the opposite side walls. Pivot means about the inner ends of the flaps enabled the flaps to pivot about horizontal axes thereabout when a transverse biasing force was applied thereto. The free end sections of the flaps were adapted to wipe the surface of the oil dipstick during oil dipstick movement through the channel, in order to remove a liquid film of oil which was deposited thereon.

U.S. Pat. No. 4,017,934, issued in 1977 in the name of Reginaldo A. Hernandez, provided an oil dipstick cleaner in which the oil dipstick can be inserted down through a slot made in a cleaner frame so that the oil dipstick itself was within the oil dipstick tube. As it was withdrawn from the oil dipstick tube, oil on the surface of the oil dipstick will be removed by the flaps contacting the oil dipstick. The free end edges of the flaps directly engaged each other, in their unbiased position.

SUMMARY OF THE INVENTION (a) Aims of the Invention

It is readily apparent that none of these patented devices solved efficiently the problem outlined above in an environmentally-friendly manner.

Accordingly, an important object of the present invention is the provision of a device which may be conveniently positioned and which will provide a ready means for cleansing the oil dipstick of any collected oil.

A further object of the invention is to produce such a device that the collection of dirt thereon, which might be thus transferred to the rod and from the rod to the oil in the sump, is effectually prevented.

A still further object of the invention is to provide a structure such that the wiping pad will at all times have good contact with the rod and thus insure removal of oil therefrom.

Another object of this invention is to provide a ready wiper positioned in a convenient place near the oil well of an engine.

Another object of this invention is to provide an oil dipstick wiper casing unit providing a quick and clean measuring of the oil level of an internal combustion engine, which will also eliminate the need for paper or cloth to wipe the oil off the oil dipstick.

Yet another object of this invention is to provide an oil dipstick wiper which helps to reduce environmental pollution by avoiding engine oil spills and the dumping of oil soaked cloth or tissue paper.

Still another object of this invention is to provide an oil dipstick wiper as original equipment to an automobile manufacturer, or as an attachment to any motorized vehicle that requires the measurement of the engine oil level with an oil dipstick.

(b) Statement of Invention

The present invention provides an oil dipstick wiper comprising: (A) an oil dipstick; and (B) a hollow housing which is selectively-releasably-engaged with an oil dipstick guide tube which is secured to an engine, the hollow housing having a central longitudinal bore therethrough, the central longitudinal bore including an upper end and a lower end, the hollow housing including (i) an upper rectangular slotted plate which is disposed at the upper end of the central longitudinal bore for guiding the oil dipstick in longitudinal sliding movement, while substantially-simultaneously preventing rotation of the oil dipstick, (ii) resilient wiper means projecting into the central longitudinal bore, so as to intrude into a major extent of the central longitudinal bore, (iii) oil catching means which is associated with the resilient wiper means, which is disposed vertically therebelow and which intrudes into the longitudinal bore for catching oil which is wiped off of the oil dipstick by the resilient wiper means when the oil dipstick is in its longitudinal non-rotatable sliding movement, and (iv) spring means which are disposed within the longitudinal bore at the lower end thereof to provide the selectively-releasable engagement with the oil dipstick guide rube, wherein the oil dipstick is selectively-slidably and non-rotatably-disposed within the central longitudinal bore of the hollow housing whereby: (a) the hollow housing and the oil dipstick are selectively-longitudinally-movable as a unit, and the oil dipstick is alternatively longitudinally slidingly and non-rotationally selectively by itself with respect to the hollow housing, and (b) when the oil dipstick is longitudinally and non-rotatably-moved by itself out of the hollow horsing, oil is wiped off of the oil dipstick by wiping contact of the oil dipstick with the resilient wiper means, and, when the oil dipstick is returned to the hollow housing and is inserted into an oil sump of the engine, and a unit comprising the hollow housing and the oil dipstick is removed from engagement from the oil dipstick guide tube, oil remains on the oil dipstick so that the level of oil in the oil sump can be determined.

The present invention also provides a method of measuring the oil level in an engine which is provided with an oil dipstick guide tube fitted with a vertically-movable oil dipstick, which comprises the steps of: providing an oil dipstick wiper comprising (A) an oil dipstick; and (B) [a hollow housing which is selectively-releasably-engaged with an oil dipstick guide tube which is secured to the engine, the hollow housing having a central longitudinal bore therethrough, the longitudinal bore including an upper end and a lower end, the hollow housing including (i) an upper rectangular slotted plate which is disposed at the upper end of the central longitudinal bore for guiding the oil dipstick in longitudinal sliding movement, while substantially-simultaneously preventing rotation of the oil dipstick, (ii) resilient wiper means projecting into the central longitudinal bore, so as to intrude into a major extent of the central longitudinal bore, (iii) oil catching means which is associated with the resilient wiper means, which is disposed vertically therebelow and which intrudes into the longitudinal bore for catching oil which is wiped off of oil dipstick by the resilient wiper means when the oil dipstick is in its longitudinal, sliding movement, and (iv) spring means which are disposed within the longitudinal bore at the lower end thereof to provide the selectively-releasable engagement with the oil dipstick guide tube; (II) while the hollow housing is engaged with the oil dipstick guide tube, removing the oil dipstick by itself from the hollow housing in an upward, vertically-sliding, non-rotatable motion in a first passage, thereby to wipe oil from the oil dipstick by wiping engagement with the resilient means; (III) replacing the oil dipstick in the hollow housing in a downward, vertically-sliding, non-rotatable motion in a second passage into an oil sump of the engine; (IV) removing the oil dipstick and the hollow housing as a unit from the oil dipstick guide tube of the engine in a third passage, in an upward, vertically-sliding motion, thereby to view the oil dipstick to enable the level of the oil in the engine sump by viewing the oil level on the oil dipstick; and replacing the combined oil dipstick and oil dipstick wiper casing on the guide tube of the engine.

(c) Other Features of the Invention

By one feature of the invention, the resilient wiper means comprises at least two wiper blades whose ends have a triangular cross-section for contacting the oil dipstick. Preferably, by another feature, the resilient wiper blades are formed of rubber. Still further preferably by a feature of this feature, the rubber wiper blades include a hollow head.

By still another feature of the invention, the oil catching means comprises an absorbent pad.

In a specific feature thereof, the absorbent pad may be provided as a plurality of individual absorbent pads, or it may be provided as a continuous annular ring. Preferably in yet another feature, the absorbent pad is formed of molded absorbent poly-wool fiber.

By yet another feature, the spring means comprises an encircling plurality of leaf springs which are made of tension steel.

DESCRIPTION OF PREFERRED EMBODIMENTS (a) BRIEF DESCRIPTION OF THE DRAWINGS

In the accompanying drawings,

FIG. 1 is a central longitudinal cross-section of the oil dipstick and the oil dipstick wiper casing unit of one embodiment of this invention, and in which

Figure 1:
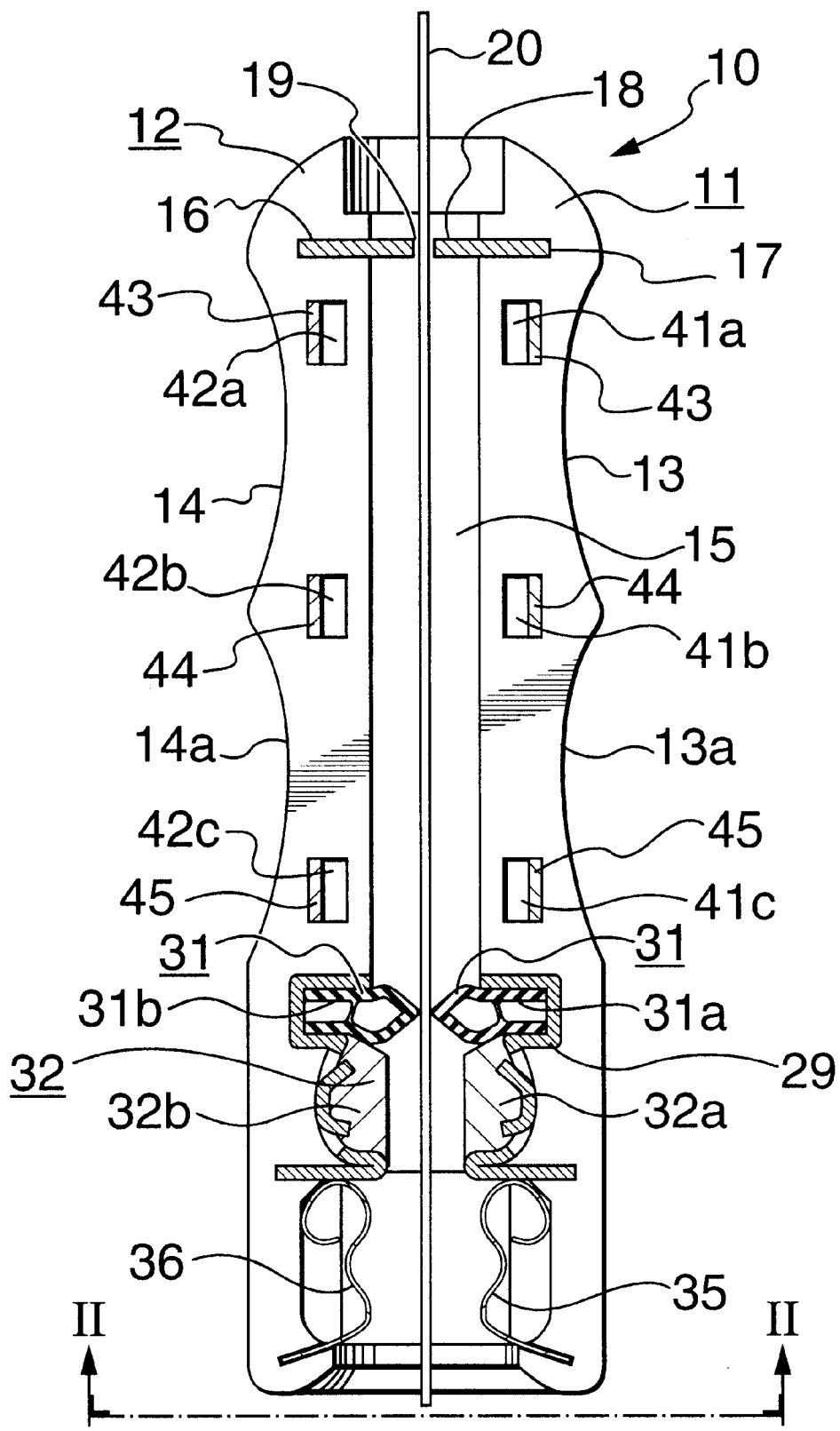
Figure 2:
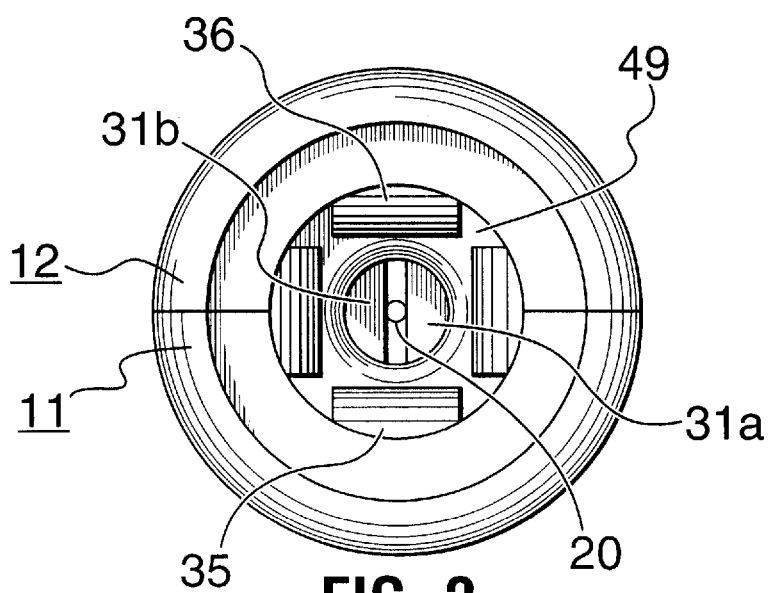
FIG. 2 is a view along the line II—II of FIG. 1.

(b) DESCRIPTION OF FIG. 1 AND FIG. 2

As seen in FIG. 1 and FIG. 2, the oil dipstick wiper casing unit 10 is a two-piece molded body 11, 12, which is formed of any suitable durable, light-weight synthetic plastic material, e.g., polyvinyl chloride, and which is provided with curved indentations 13, 14, 13a, 14a to assist in gripping. Each two-piece molded body 11, 12 is provided with three longitudinally-spaced-apart slots 41a, 41b, 41c, and 42a, 42b, 42c to enable assembly by respective clips or holding pins 43, 44, 45. In its assembled form, as shown in FIG. 1 and in FIG.3, the oil dipstick wiper casing unit 10 includes a central longitudinal bore 15.

The molded body 11, 12 is provided with an upper slot-like channel 16, 17 within which is fitted a rectangular slot plate 18, which is preferably formed of carbon steel, and which includes a central rectangular slot 19 to accommodate the oil dipstick 20. The rectangular slot 14 not only guides an oil dipstick in a vertically-sliding movement, but also positively prevents rotation of the oil dipstick.

Figure 1A:
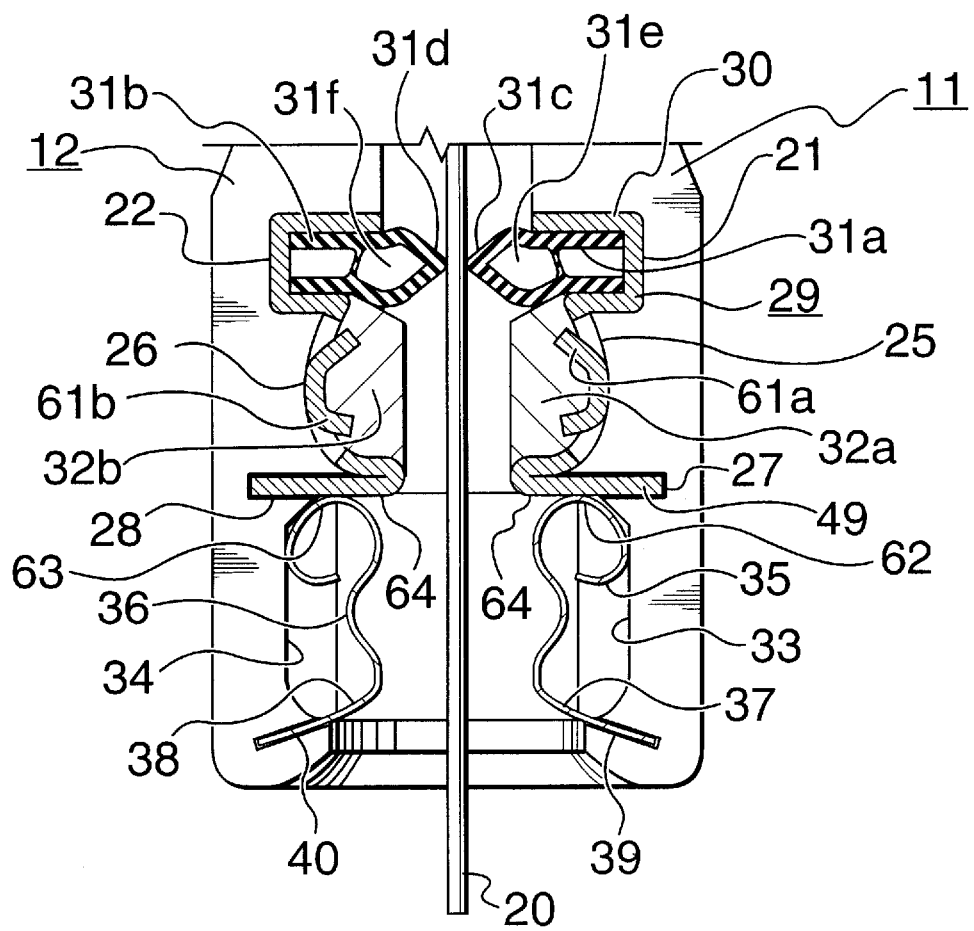
FIG. 1A is a slightly-enlarged view of the lower portion thereof.

As seen more clearly in the somewhat enlarged view of the lower portion of the oil dipstick wiper casing unit 10 in FIG. 1A, the molded body 11, 12 also is provided with an inner peripheral channel 21, 22, and coextensive inner arcuate indented seats 25, 26 and lower slot-like channels 27, 28, within which (when assembled) is fitted a frame 29. The frame 29 is preferably made of aluminum, and holds the wipers (generally designated 31) and the oil drip catchers, (generally designated 32), as will be further described. When assembled, the upper part of the frame 29 secures an annular holding inner-seated gasket 30, which secures two rubber or similar resilient wipers 31*a*, 31*b* within its inner seat. The wipers 31*a*, 31*b* preferably have heads 31*c*, 31*d*, which have a triangular cross-section and still more preferably, such heads being hollow (31*e*, 31*f*).

The lower part of frame 29 secures four drip catchers, only two of which 32*a*, 32*b* being seen in FIG. 1 and in FIG. 1A, which are preferably formed as molded absorbent poly-wool fiber pads. The drip catchers 32*a*, 32*b*, are further held in place by gripping fingers 61*a*, 61*b* which are integrally-punched out of frame 29.

The lowermost part of the molded body 11, 12 is provided with an enlarged diameter bore 33, 34 within which is secured seat or leaf springs 35, 36, which are preferably formed of tension steel. The leaf springs 35, 36 are further held in place at their lower ends 37, 38, by being fitted within angular slots 39, 40, respectively, in the molded body 11,12. The upper ends 62,63, of the springs 35,36, abut the lower face of annular sealing plate 49 which is fitted into channels 27,28.

It is preferred that the plastic parts be molded by means of a plastic extraction process and that an oil resistant material, e.g. PVC, be used. For easier detection of the oil dipstick wiper casing unit in the clutter of an engine compartment of the automobile, it is preferred that the oil dipstick wiper casing unit casing be manufactured in the colour of neon-orange.

The rectangular slot plate 18 is mounted inside the upper part of the oil dipstick wiper casing unit 10. The slot plate 18 is, e.g., 2 mm thick, and includes a rectangular slot 19 of, e.g., 6 mm×2 mm, in order to guide an oil dipstick 20 in its vertical sliding movement, while substantially-simultaneously positively preventing rotation of the oil dipstick. It also allows the oil dipstick 20 with all its curvatures to be inserted, but prevents the oil dipstick 20 from being extracted from the oil dipstick wiper casing unit 10. An overenthusiastic pull on the oil dipstick 20 will not result in any damage. It would simply cause the oil dipstick wiper casing unit 10 to be pulled from its seat on the end of the oil dipstick guide tube 50. Placing the oil dipstick wiper casing unit 10 back onto the oil dipstick guide tube 50 puts the unit into operational mode and permits the oil dipstick 20 to be pushed back into the oil dipstick guide tube 50.

It is preferred that the wipers 31*a*, 31*b* be made of firm but flexible and oil-resistant rubber-compound material, e.g., as is used for oil seals. The material out of which the wipers 31*a*, 31*b* which are, e.g., 6 mm wide, are produced should preferably be an endless length of molded rubber.

It is preferred that the drip catchers 32*a*, 32*b* be in the form of a molded poly-wool mix fiber pad that is very absorbent and at the same time gradually sheds an overload of the oil that it holds due to the heat and vibration of the engine.

It is preferred that the frame 29 that holds the wipers 31*a*, 31*b* and the drip catchers 32*a*, 32*b* be made from aluminum sheet material of, e.g., 1 mm thick and 6 mm wide. The surface of the inside of the central seat in the annular holding inner-seated gasket 30 is preferably roughened to a coarseness of e.g., 0.1 mm, to provide the required grip on the rubber wiper 31*a*, 31*b*. Furthermore, the frame 29 has a height of, e.g., 3.7 mm, which implies that the rectangular ends of the rubber wipers, which have a thickness of, e.g., 4 mm, will be compressed and held securely in place. The curved drip catcher seat is provided with two triangular pins or fingers 61*a*, 61*b* which are punched out of the aluminum material. As the drip catchers 32*a*, 32*b* will not come into contact with any moving part, such fingers 61*a*, 61*b* are deemed to be sufficient to hold the drip catchers 32*a*, 32*b* in place. The lowest part of the frame 29 secures the annular sealing plate 49 within channels 27, 28. Annular sealing plate 49 serves as an upper abutment 64 for the leaf springs 35,37. In addition it serves as an upper stop 65 for the oil dipstick guide tube 50, and as a lip for guiding run-off oil back into the oil dipstick guide tube, and thence to the oil pan of the engine.

It is preferred that the leaf springs 35, 36 be made from high tension steel of, e.g., 0.3 mm thickness, and that they be held in place at their lower ends 37, 38, by a press fitting within channels 39, 40 of, e.g., 4 mm deep, in the lower part of the casing 11, 12. The perpendicular tension of the spring amounts to, e.g., 4 kilograms per square millimeter, spread over two contact points. Due to its structure, the tension of the springs 35, 36 increases proportionately to the diameter of the oil dipstick guide tube 50 into which the oil dipstick wiper casing unit 10 is inserted. This implies that the oil dipstick wiper casing unit 10 will have an equal strength hold on various sizes of oil dipstick guide tubes 50. It allows for a maximum outside diameter of the oil dipstick guide tube of, e.g., 14 mm.

The oil dipstick wiper casing unit 10 is provided in three sub-assembled parts, namely: the pre-assembled, longitudinal female half of the casing 11 which contains the wipers 31*a*, 31*b*, the drip catchers 32*a*, 32*b* and frame 29 and three of the four leaf springs 35; the pre-assembled male half of the casing 12 which contains one leaf spring 36; and the slot plate 18.

The oil dipstick wiper casing unit 10, which is provided in such three parts, may be assembled in the following manner. The oil dipstick is removed from its oil dipstick guide tube that is affixed to the engine block. The oil dipstick is inserted into the slot plate, passing its entire length with its semi-spheric or twisted visual aids at the lower end through the slot. The rectangular slot plate is inserted with one of its short sides into its molded seat at the upper end of the female half of the casing and the oil dipstick is pushed into position between the two rubber wipers. The male half of the casing is positioned with its slot plate seat over the slot plate, the six holding clips or pins over the six slots and the wipers and spring seats over the wiper elements and springs of the female half, and it is snapped shut into its operational shape with equal pressure, using both hands. The oil dipstick guide tube is shortened by about 80 mm with a small tube cutter (The use of a hacksaw is not recommended as metal shavings may enter the oil pan and cause damage to the engine when sucked into the lubrication cycle). Optionally and/or if required, the new edge of the oil dipstick guide tube may be bevelled for yet a better hold of the wiper unit, but this is not essential. Furthermore, some types of automobiles have the oil dipstick guide tube affixed by an extension clamp. Should the tube have to be cut below the clamp, then an optional new carbon steel extension clamp (which will be supplied with the oil dipstick casing wiper unit) will have to be installed. The oil dipstick wiper casing unit is pushed onto the end of the oil dipstick guide tube until the upper rim of the oil dipstick guide tube touches the stop of the oil dipstick wiper casing unit and the oil dipstick is pushed down inside the oil dipstick wiper casing unit and into the oil dipstick guide tube until its tube cap fits into the top opening of the wiper unit.

The oil dipstick wiper casing unit is linked to the conventional, i.e., unchanged, oil dipstick by the carbon steel slot plate and is held in place at the upper end of the shortened oil dipstick guide tube by four high-tension steel leaf springs. The rubber wipers and poly-wool fiber drip catchers are mounted inside a sturdy aluminum frame which is embedded inside the grip-like, molded casing which may preferably be made from polyvinyl chloride (PVC) or similar durable, light-weight plastic material.

The location and the material of the wipers, which are firm but fully flexible, hollow rubber moldings with a horizontal expansion of e.g., 5 mm, from compressed to fully extended position, and the drip catchers, which are molded, absorbent poly-wool fiber pads, assure that any and all oil is wiped off the oil dipstick, is absorbed by the drip catchers and will eventually run off and enter the oil dipstick guide tube on its way down to the oil sump or oil pan.

Alternatively to the above procedure, a completely assembled oil dipstick wiper casing unit with a new, 60 mm longer installed oil dipstick can be delivered. Such an assembled unit foregoes the shortening of the guide tube and requires only the exchange of the old or installed oil dipstick for the new unit, but it is suitable only for automobiles that provide sufficient space in the engine compartment for the oil dipstick wiper casing unit atop the unchanged guide tube.

Figure 3:
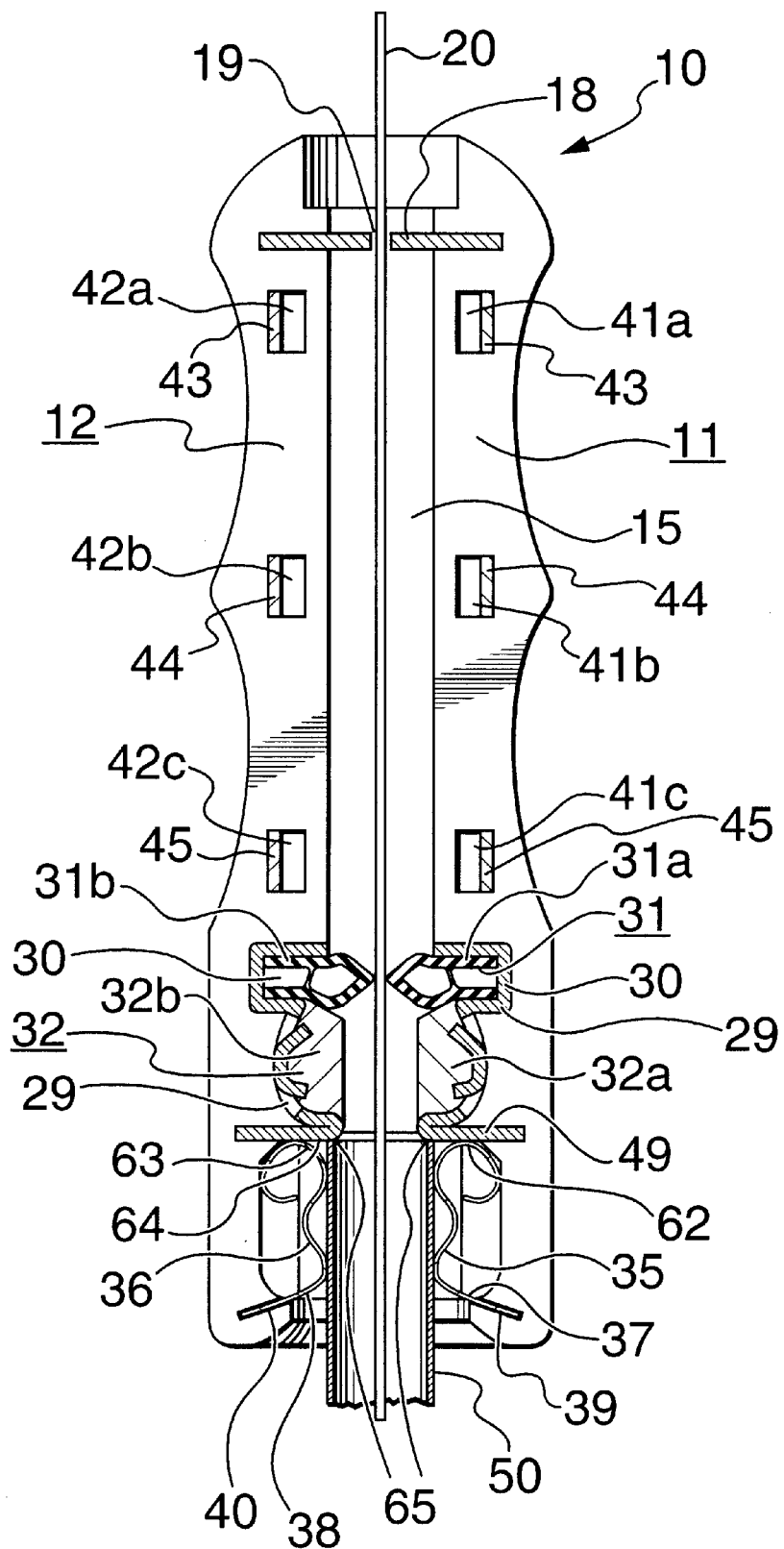
FIG. 3 is a central longitudinal cross-section of the oil dipstick wiper casing unit of one embodiment of this invention in its installed orientation on the oil dipstick guide tube of the engine.

(c) DESCRIPTION OF FIG. 3

The assembled oil dipstick wiper casing unit is shown in FIG. 3, with the oil dipstick wiper casing unit seated on a standard oil dipstick guide tube 65 of e.g., 9 mm diameter. The rubber wipers are slightly compressed in this position and extend/compress in unison to provide consistent cleaning action of the curved and/or twisted sections at the lower end of the oil dipstick.

(d) USE OF THE INVENTION

The preferred manner of use is as follows.

The oil dipstick wiper casing unit, held in place by four leaf springs on the upper end of the oil dipstick guide tube, cleans the oil dipstick of oil residue while it is pulled up and permits a clear measurement of the engine oil level, as follows: The oil dipstick is pulled up through the oil dipstick wiper casing unit until the semi-spheric or twisted visual aids at the lower end of the oil dipstick touch the slot plate of the oil dipstick wiper casing unit, all the while the rubber wipers clean the oil dipstick of oil residues which are caught by the drip catchers. The upward pulling of the oil dipstick is an exclusively-vertical sliding movement with no component of rotational movement. The oil dipstick is pushed down again until its tube cap or similar stop fits into the top opening of the oil dipstick wiper casing unit and the lower end is inserted into the oil dipstick guide tube leading to the oil sump. The downward pushing of the oil dipstick is an exclusively vertical sliding movement with no component of rotational movement. The oil dipstick wiper casing and the oil dipstick as a unit is pulled off the guide tube. A visual check of the oil level on the oil dipstick is taken. The oil dipstick is reinserted in an exclusively-vertical sliding motion with no component of rotational motion, into the guide tube and pushed down together with the oil dipstick wiper casing unit. Finally, the oil dipstick wiper casing unit is pushed onto the oil dipstick guide tube until it sits firmly and the rim of the oil dipstick guide tube touches the stop, i.e., the lower lip of the oil dipstick wiper casing unit.

This simple procedure of pulling up the oil dipstick, pushing it back to its original position of full insertion, then extracting it by the oil dipstick wiper casing unit, taking a reading of the oil level of the engine and reinserting the combined oil dipstick wiper casing unit and the oil dipstick provides a quick and clean oil check for the user and the environment.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. An oil dipstick wiper comprising:

(A) an oil dipstick; and (B) a hollow housing which is selectively-releasably-engaged with an oil dipstick guide tube which is secured to an engine, said hollow housing having a central longitudinal bore therethrough, said central longitudinal bore including an upper end and a lower end, said hollow housing including:

(i) an upper rectangular slotted plate which is disposed at said upper end of said central longitudinal bore for guiding said oil dipstick in longitudinal sliding movement, while substantially-simultaneously preventing rotation of said oil dipstick;

(ii) resilient wiper means projecting into said central longitudinal bore, so as to intrude into a major extent of said central longitudinal bore, (iii) oil catching means which is associated with said resilient wiper means and which is disposed vertically therebelow and which intrudes into said longitudinal bore for catching oil which is wiped off of oil dipstick by said resilient wiper means, and (iv) spring means which are disposed within said longitudinal bore at said lower end thereof to provide said selectively-releasable engagement with said oil dipstick guide tube;

wherein said an oil dipstick is selectively-slidably and non-rotationally-disposed within said central longitudinal bore of said hollow housing;

whereby:

(a) said hollow housing and said oil dipstick are selectively-longitudinally-movable as a unit, and said oil dipstick is alternatively longitudinally, slidingly, and non-rotationally-selectively-movable by itself with respect to said hollow housing; and (b) when said oil dipstick is longitudinally-moved by itself out of said hollow housing, oil is wiped off of said oil dipstick by wiping contact of said oil dipstick with the resilient wiper means, and, when said oil dipstick is returned to said hollow housing and is inserted into an oil sump of the engine and when a unit comprising said hollow housing and said oil dipstick is removed from engagement with said oil dipstick guide tube, oil remains on said oil dipstick so that the level of oil in said oil sump can be determined.

2. The oil dipstick wiper as claimed in claim 1 wherein said resilient wiper means comprises at least two wiper blades whose ends have a triangular cross-section for contacting said oil dipstick.

3. The oil dipstick wiper as claimed in claim 2 wherein said wiper blades are formed of rubber.

4. The oil dipstick wiper as claimed in claim 3 wherein said wiper blades which are formed of rubber include a hollow head.

5. The oil dipstick wiper as claimed in claim 1 wherein said oil catching means comprises an absorbent pad.

6. The oil dipstick wiper as claimed in claim 5 wherein said absorbent pad is provided as a plurality of individual absorbent pads.

7. The oil dipstick wiper as claimed in claim 5 wherein said absorbent pad is provided as a continuous annular ring.

8. The oil dipstick wiper as claimed in claim 5 wherein said absorbent pad is formed of molded absorbent poly-wool fiber.

9. The oil dipstick wiper as claimed in claim 1 wherein said spring means comprises an encircling plurality of leaf springs which are made of tension steel.

10. A method of measuring the oil level in an engine which is provided with an oil dipstick guide tube into which is fitted a vertically-movable oil dipstick, which comprises the steps of:

(I) providing an oil dipstick wiper comprising: (A) an oil dipstick; and (B) a hollow housing which is selectively-releasably-engaged with an oil dipstick guide tube which is secured to said engine, said hollow housing having a central longitudinal bore therethrough, said longitudinal bore including an upper end and a lower end, said hollow housing including (i) an upper rectangular slotted plate which is disposed at said upper end of said central longitudinal bore for guiding said oil dipstick in longitudinal sliding movement, while substantially-simultaneously preventing rotation of said oil dipstick; (ii) resilient wiper means projecting into said central longitudinal bore, so as to intrude into a major extent of said central longitudinal bore, (iii) oil catching means which is associated with said resilient wiper means and which is disposed vertically therebelow and which intrudes into said longitudinal bore for catching oil which is wiped off of oil dipstick by said resilient wiper means, when said oil dipstick is in its exclusive longitudinal sliding movement, and (iv) spring means which are disposed within said longitudinal bore at said lower end thereof to provide said selectively-releasable engagement with said oil dipstick guide tube;

(II) while said hollow housing is engaged with said oil dipstick guide tube, removing said oil dipstick by itself from said hollow housing in an upward, exclusively vertically-sliding non-rotational motion in a first passage, thereby to wipe oil from said oil dipstick;

(III) replacing said oil dipstick in said hollow housing in a downward, exclusively vertically-sliding non-rotational motion in a second passage into an oil sump of said engine;

(IV) removing said oil dipstick and said hollow housing as a unit from said oil dipstick guide tube of said engine in a third passage, in an upward sliding motion thereby to view said oil dipstick to enable the measurement of the oil level in the engine by viewing the oil level on said oil dipstick; and (V) replacing said oil dipstick and said hollow housing as a unit on said oil dipstick guide tube of said engine.

\* \* \* \* \*